(12) United States Patent
O'Brien

(10) Patent No.: US 8,404,337 B2
(45) Date of Patent: Mar. 26, 2013

(54) DIFFUSE REFLECTOR, DIFFUSE REFLECTIVE ARTICLE, OPTICAL DISPLAY, AND METHOD FOR PRODUCING A DIFFUSE REFLECTOR

(75) Inventor: William George O'Brien, Newark, DE (US)

(73) Assignee: E I du Pont de Nemours and Company, Wilmington, DE (US)

( * ) Notice: Subject to any disclaimer, the term of this patent is extended or adjusted under 35 U.S.C. 154(b) by 871 days.

(21) Appl. No.: 12/519,830

(22) PCT Filed: Dec. 17, 2007

(86) PCT No.: PCT/US2007/025737
§ 371 (c)(1),
(2), (4) Date: Jun. 18, 2009

(87) PCT Pub. No.: WO2008/076410
PCT Pub. Date: Jun. 26, 2008

(65) Prior Publication Data
US 2010/0014164 A1    Jan. 21, 2010

Related U.S. Application Data

(60) Provisional application No. 60/875,476, filed on Dec. 18, 2006.

(51) Int. Cl.
*F21V 7/22* (2006.01)
(52) U.S. Cl. .......... 428/220; 427/162; 362/609
(58) Field of Classification Search ............ 362/296.01, 362/341, 609; 428/220; 359/599; 427/162
See application file for complete search history.

(56) References Cited

U.S. PATENT DOCUMENTS

| | | | | |
|---|---|---|---|---|
| 4,999,222 A | * | 3/1991 | Jones et al. | 427/250 |
| 5,122,412 A | * | 6/1992 | Jones et al. | 442/376 |
| 6,830,713 B2 | * | 12/2004 | Hebrink et al. | 264/1.6 |
| 7,060,346 B2 | * | 6/2006 | Yagi et al. | 428/220 |
| 7,660,040 B2 | * | 2/2010 | Starry et al. | 359/599 |
| 2005/0175827 A1 | * | 8/2005 | Hebrink et al. | 428/212 |
| 2008/0080055 A1 | * | 4/2008 | Lightfoot et al. | 359/599 |
| 2010/0014164 A1 | * | 1/2010 | O'Brien | 359/599 |
| 2010/0238665 A1 | * | 9/2010 | Teather | 362/296.01 |
| 2011/0064939 A1 | * | 3/2011 | Teather et al. | 428/316.6 |
| 2011/0103066 A1 | * | 5/2011 | Teather | 362/296.01 |

* cited by examiner

Primary Examiner — Mark Consilvio

(57) ABSTRACT

Disclosed is a diffuse reflector comprising a consolidated nonwoven sheet having a thickness standard deviation of about 15 μm or less and a photopic reflectance of at least about 94% over the wavelength range of 380 nm to 780 nm. Further disclosed is a diffuse reflective article and optical display utilizing such a diffuse reflector, a method for producing such a diffuse reflector, and a method of improving light reflectivity utilizing such a diffuse reflector.

20 Claims, 4 Drawing Sheets 100 microns 2 microns

DIFFUSE REFLECTOR, DIFFUSE REFLECTIVE ARTICLE, OPTICAL DISPLAY, AND METHOD FOR PRODUCING A DIFFUSE REFLECTOR

FIELD OF THE DISCLOSURE

This disclosure relates to a diffuse reflector of light, a diffuse reflective article utilizing a diffuse reflector, an optical display utilizing a diffuse reflector, a method for producing a diffuse reflector, and a method of improving light reflectivity utilizing a diffuse reflector.

BACKGROUND

Diffuse reflectivity of visible light is important in many applications. Direct view displays used in electronic equipment (e.g., instrument panels, portable computer screens, liquid crystal displays (LCDs)), whether relying on supplemental lights (e.g., backlight) or ambient light, require diffuse reflectant back surfaces to maximize image quality and intensity. Reflectivity is particularly important with backlit direct view displays in battery powered equipment, where reflectivity improvements directly relate to smaller required light sources and thus lower power demands.

Portable computer LCDs are a substantial and demanding market requiring high levels of diffuse reflection of visible light from very thin materials. For certain markets it is important that the backlight reflector is relatively thin, i.e., less than 250 μm and sometimes less than 150 μm, to minimize the thickness of the completed display.

The reflective material used in LCD backlights has a significant effect on the brightness, uniformity, color and stability of the backlight unit and, ultimately, the LCD module. For a direct view LCD backlight, requirements for the reflector can include high photopic reflectance (e.g., sometimes greater than 95%) and stability under use conditions including cavity temperatures of 50° C. to 70° C., stability to ultraviolet (UV) light from cold cathode fluorescent lamp (CCFL) sources, as well as to humidity and temperature cycling. In direct view backlights, the reflector is an integral part of the backlight unit and, therefore, the physical properties of the material are also important. Requirements for an edgelit backlight differ in that the operating temperature is typically lower and the need for UV stability can be less in instances where there is UV absorption in the light guide. However, additional requirements on edgelit backlight reflectors include the need to make uniform contact with the light guide without damaging it, and minimizing reflector thickness.

BRIEF DESCRIPTION OF THE DRAWINGS

An embodiment is illustrated in the accompanying figure to improve understanding of concepts as presented herein.

Figure 1:
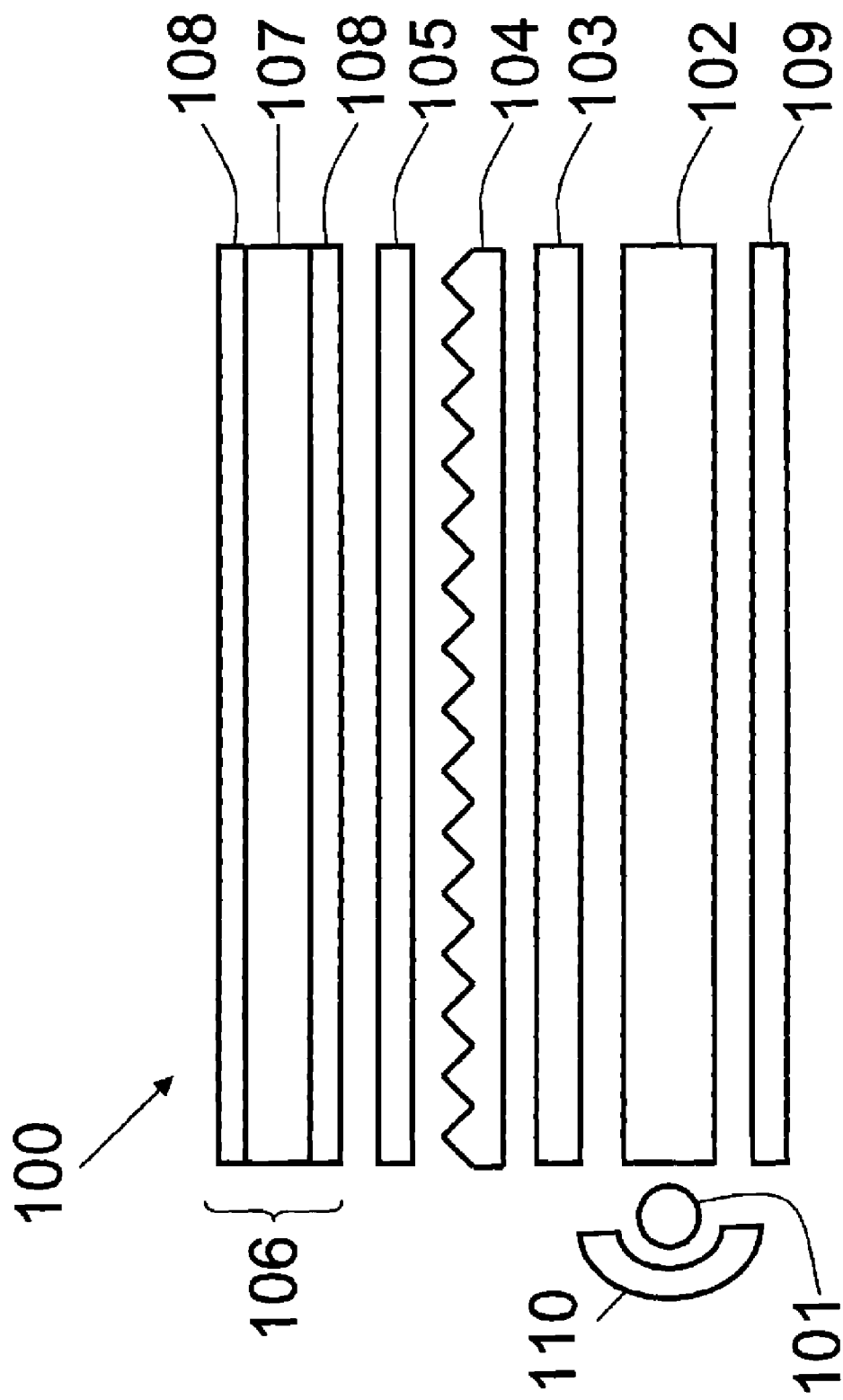
FIG. 1 includes as illustration a cross-sectional view of an edgelit liquid crystal optical display utilizing a present diffuse reflector.

Skilled artisans appreciate that objects in the figure are illustrated for simplicity and clarity and have not necessarily been drawn to scale. For example, the dimensions of some of the objects in the figure may be exaggerated relative to other objects to help to improve understanding.

DESCRIPTION

Disclosed is a diffuse reflector comprising a consolidated nonwoven sheet having a thickness standard deviation of about 15 μm or less and a photopic reflectance of at least about 94% over the wavelength range of 380 nm to 780 nm.

In some embodiments, the thickness standard deviation is about 10 μm or less. In some embodiments, the consolidated nonwoven sheet has an average thickness of from about 150 μm to about 400 μm.

In some embodiments, "consolidated nonwoven sheet" is intended to mean a nonwoven sheet that has been subjected to the application of a mechanical force. In such embodiments, a diffuse reflector comprising a consolidated nonwoven sheet is produced by applying a mechanical force to a nonwoven sheet having a first average thickness, a first thickness standard deviation and a first photopic reflectance.

"First average thickness" is intended to mean the average thickness of the nonwoven sheet before application of the mechanical force. In some embodiments, the first average thickness is generally from about 150 μm to about 400 μm. In some embodiments, the diffuse reflector can be produced by the application of mechanical force to a laminate of a plurality of layers of nonwoven sheet. In such embodiments, the term first average thickness relates to the average thickness of the laminate prior to the application of mechanical force. In some embodiments, the first average thickness of a nonwoven sheet laminate can be about 1,200 μm or greater. In some embodiments, the diffuse reflector can arise from application of mechanical force to a nonwoven sheet having on at least one face thereof a binder layer containing binder and scatterer of visible light dispersed therein. In such embodiments, the term first average thickness relates to the average thickness of the nonwoven sheet having on at least one face thereof said binder layer prior to the application of mechanical force.

"First thickness standard deviation" is intended to mean the thickness standard deviation of the nonwoven sheet before application of the mechanical force. In some embodiments, the nonwoven sheet first thickness standard deviation is greater than about 20 μm.

"First photopic reflectance" is intended to mean the photopic reflectance of the nonwoven sheet before application of the mechanical force. In some embodiments, the nonwoven sheet first photopic reflectance is at least about 94%.

Applying mechanical force to the nonwoven sheet forms a consolidated nonwoven sheet having a consolidated average thickness that is less than the first average thickness, a consolidated thickness standard deviation that is less than the first thickness standard deviation, and a consolidated photopic reflectance that is substantially identical to the first photopic reflectance.

"Consolidated average thickness" is intended to mean the average thickness of the nonwoven sheet after application of the mechanical force. The nonwoven sheet consolidated average thickness is less than the first average thickness. In some embodiments, the nonwoven sheet consolidated average thickness is from about 75% to about 95% of the first average thickness. In some embodiments, the nonwoven sheet consolidated average thickness is from about 80% to about 90% of the first average thickness. In some embodiments, the nonwoven sheet consolidated average thickness is from about 150 µm to about 400 µm.

"Consolidated thickness standard deviation" is intended to mean the thickness standard deviation of the nonwoven sheet after application of the mechanical force. The nonwoven sheet consolidated thickness standard deviation is less than the first thickness standard deviation. In some embodiments, the nonwoven sheet consolidated thickness standard deviation is from about 25% to about 55% of the first thickness standard deviation. In some embodiments, the nonwoven sheet consolidated thickness standard deviation is from about 30% to about 50% of the first thickness standard deviation. In some embodiments, the consolidated thickness standard deviation is about 10 µm or less.

The term "visible light" is intended to mean electromagnetic radiation in the visible light portion of the spectrum, from 380 nm to 780 nm wavelength.

The term "photopic reflectance" (also herein abbreviated as $R_{VIS}$) of light is intended to mean the reflectance (i.e., diffuse and specular reflectance) as seen by a human observer over the visible light wavelength range. Photopic reflectance is calculated from total reflectance spectral data using illuminant D65 and the CIE Standard Photopic observer described in "Billmeyer and Saltzman Principles of Color Technology", $3^{rd}$ Edition.

"Consolidated photopic reflectance" is intended to mean the photopic reflectance of the nonwoven sheet after application of the mechanical force. In some embodiments, the nonwoven sheet consolidated photopic reflectance is substantially identical to the first photopic reflectance. In some embodiments, the consolidated photopic reflectance is not reduced from the first photopic reflectance within the error of measurement by the present Reflectance Spectra—Spectrophotometer Method test method described in the present Examples section. In some embodiments, the consolidated photopic reflectance is decreased by about 1% or less from the first photopic reflectance following the application of the mechanical force to the nonwoven sheet.

Diffuse Reflective Article

The present diffuse reflectors have utility in diffuse reflective articles. In some embodiments, the diffuse reflective article comprises a diffuse reflector of light positioned within a structure defining an optical cavity, wherein said diffuse reflector of light comprises a consolidated nonwoven sheet having a thickness standard deviation of about 15 µm or less and a photopic reflectance of at least about 94% over the wavelength range of 380 nm to 780 nm. In some embodiments, the diffuse reflector has at least one nonwoven face and is positioned within the optical cavity such that light reflects off of the nonwoven face. In some embodiments, the diffuse reflective article can further comprise: (i) a light source positioned within the optical cavity; and (ii) a display panel through which light from the light source passes, wherein the diffuse reflector is positioned within the optical cavity for reflecting light from the light source toward the display panel.

The term "optical cavity" is intended to mean an enclosure designed to receive light from a light source, and condition and direct such light toward an object benefiting from illumination. Optical cavities include structures for integrating, redirecting and/or focusing light from a source onto a receiver and may use air or high refractive index elements as the cavity medium. The geometrical shape of the structure is not limited. Example structures containing optical cavities include luminaires, copying machines, projection display light engines, integrating sphere uniform light sources, sign cabinets, light conduits and backlight assemblies. In some embodiments, such as backlight units for liquid crystal displays (LCDs), the optical cavity can include a lightguide or waveguide. In the context of an optical display, optical cavity can refer to an enclosure designed to contain a light source and direct the light from the light source toward a display panel. Display panels can include static and dynamic (addressable) display types.

The term "light source" is intended to mean emitters of visible light and can be a single light source within an optical cavity or multiple light sources within an optical cavity. Example light sources include bulb and tube lamps of type incandescent, mercury, metal halide, low pressure sodium, high pressure sodium, arc, compact fluorescent, self ballasted fluorescent, cold cathode fluorescent lamp (CCFL), light emitting diode (LED) and similar apparatus capable of emitting visible light.

The term "display panel" is intended to mean transmissive devices that modulate the transmission of light from a light source, and in some embodiments, modulate light for the purpose of conveying an image in the form of visible light to a viewer. In some embodiments where a structure defining an optical cavity is a luminaire or sign cabinet system for the purpose of conveying a static image to a viewer, example display panels include polymer or glass panels with a static image contained thereon (e.g., a text or pictorial image) or alternately, no image (e.g., a fluorescent light diffuser). In some embodiments where a structure defining an optical cavity is a backlight unit for a display for the purpose of conveying static and/or changing images to a viewer, an example display panel includes a liquid crystal with an image which changes in response to an electronic signal.

Optical Display

The present diffuse reflectors have utility in optical displays. In some embodiments, the optical display comprises: (i) a structure defining an optical cavity; (ii) a light source positioned within the optical cavity; (iii) a display panel through which light from the light source passes; and (iv) a diffuse reflector positioned within said optical cavity for reflecting light from said light source toward said display panel, wherein said diffuse reflector of light comprises a consolidated nonwoven sheet having a thickness standard deviation of about 15 µm or less and a photopic reflectance of at least about 94% over the wavelength range of 380 nm to 780 nm.

Diffuse reflective article or optical display contains a diffuse reflector positioned within the optical cavity for reflecting light toward an object benefiting from illumination. The diffuse reflector is positioned within the optical cavity so that it reflects back toward the object light within the optical cavity which is not directed toward the object. The diffuse reflector is positioned within the optical cavity so that it reflects light off of a nonwoven sheet face of the diffuse reflector toward the object benefiting from illumination. In an optical display, the diffuse reflector is positioned behind the optical display light source illuminating the display panel. The light scattering and diffuse reflection characteristics of the present diffuse reflectors provide more overall diffuse lighting, e.g., a more overall diffuse light source and therefore a more evenly lit or uniformly illuminated optical display.

A schematic figure of an embodiment of optical display utilizing a present diffuse reflector is shown in FIG. 1. FIG. 1 includes as illustration a cross-sectional view of an edgelit liquid crystal optical display utilizing a present diffuse reflector. In FIG. 1, an optical display 100 is shown having a fluorescent light source 101 coupled to an optical cavity containing a plastic light guide 102. A diffuser sheet 103, a brightness enhancing film 104, such as described in U.S. Pat. No. 4,906,070, and a reflective polarizer film 105, such as described in PCT publication WO 97/32224, are placed on top of the guide 102 and act to redirect and reflectively polarize the light emitted from the guide 102 toward a liquid crystal display panel 106 and a viewer. A liquid crystal display panel 106 is placed on top of the reflective polarizing film 105 and is typically constructed of a liquid crystal 107 contained between two polarizers 108.

The light guide 102 directs light towards the display panel 106 and ultimately a viewer. Some light is reflected from the back surface of the light guide 102. A present diffuse reflector 109 is placed behind the light guide 102 with a nonwoven face of the diffuse reflector 109 facing the light guide 102. The diffuse reflector 109 reflects light towards the liquid crystal display panel 106. It also reflects and randomizes the polarization of the light reflected from the reflective polarizing film 105 and brightness enhancing film 104 layers. The diffuse reflector 109 is a highly reflective, high diffusivity surface that enhances the optical efficiency of the optical cavity. The diffuse reflector 109 scatters and reflects light diffusely, depolarizes the light, and has high reflectance over the visible wavelength range.

The diffuse reflector 109 is an element of a light recycling system. The diffuse reflector (i) reflects light rejected from the reflective polarizing film 105 and/or from the brightness enhancement film 104, and (ii) gives that light another opportunity to reach the liquid crystal display panel 106 and ultimately a viewer. This rejecting and recycling can occur numerous times increasing the luminance of the optical display (i.e., the amount of light directed towards the viewer).

This increased optical efficiency of the diffuse reflector can be used to reflect incident light between layer 104 and the diffuse reflector 109 to increase display luminance by controlling the angles over which light is emitted. For instance, brightness enhancing film 104 transmits light within a specific, and narrow angular range and reflects light over another, specific and wider angular range. The reflected light is scattered by the diffuse reflector 109 into all angles. The light within the transmission angles of the brightness enhancing layer 104 is transmitted towards the viewer. Light in the second angular range is reflected by layer 104 for additional scattering by the diffuse reflector 109.

The increased optical efficiency of the diffuse reflector 109 can be used to reflect incident light between the reflective polarizer film 105 and the diffuse reflector 109 to increase display luminance by controlling the polarization state of the light transmitted through the reflective polarizer film 105. Most displays have an absorbing polarizer 108 applied to the back of the display panel 107. At least one half of the available light is absorbed when the display is illuminated by unpolarized light. As a result, display luminance is decreased and the display polarizer 108 is heated. Both adverse situations are overcome with the use of a reflective polarizer film 105, because the reflective polarizer film 105 transmits light of one linear polarization state and reflects the other linear polarization state. If the transmission axis of the reflective polarizer film 105 is aligned with the absorbing polarizer transmission axis, the transmitted light is only weakly absorbed by the absorbing polarizer. Also, the light in the reflected polarization state is not absorbed at all by the absorbing polarizer. Instead, it is reflected towards the diffuse reflector 109. The diffuse reflector 109 depolarizes the light, creating a polarization state that has equal polarization components in the reflective polarizer film transmission and reflection states. One half of the light transmits through the reflective polarizer layer 105 towards the viewer. Light in the reflected polarization state, or "undesirable" state, is again scattered by the diffuse reflector 109, providing yet another chance for additional polarization conversion.

Additionally, a present diffuse reflector 110 can be placed behind or around the light source 101, such as a cold cathode fluorescent lamp (CCFL) to increase light coupling efficiency into the plastic light guide 102. The diffuse reflector 110 can be used alone, or in combination with a specular reflector to increase the total reflectance of the construction. When such a specular reflector is used, it is positioned behind the diffuse reflector 110 such that the diffuse reflector remains facing the light source 101.

Method for Producing a Diffuse Reflector by Applying Mechanical Force To a Nonwoven Sheet In some embodiments, a method for producing a diffuse reflector comprising a consolidated nonwoven sheet comprises applying mechanical force to a nonwoven sheet having a first average thickness, a first thickness standard deviation and a first photopic reflectance, and thereby forming a consolidated nonwoven sheet having a consolidated average thickness less than said first average thickness, a consolidated thickness standard deviation less than said first thickness standard deviation, and a consolidated photopic reflectance substantially identical to said first photopic reflectance.

In some embodiments, mechanical force is applied to the faces of the nonwoven sheet thereby producing the consolidated nonwoven sheet. Conventional methodology for applying force to a sheet structure such as calendaring and pressing are of utility for applying mechanical force to the faces of the nonwoven sheet. In some embodiments, mechanical force is applied substantially normal to the faces of the nonwoven sheet. In some embodiments, mechanical force is applied off of normal to the faces of the nonwoven sheet.

In some embodiments, mechanical force is applied to the faces of the nonwoven sheet by calendering. By "calendering" is intended to mean that the nonwoven sheet is passed between rollers or plates which impart a pressure to the faces of the nonwoven sheet.

In some embodiments, calendering comprises at least one set of counter-rotationally driven rolls axially loaded to create a nip point that can be fed with nonwoven sheet stock or continuous nonwoven sheet. The nip gap can be essentially zero with direct roll-to-roll contact so that the full axial load is applied to the nonwoven sheet. In some embodiments, the nip gap can be set to pre-selected values representing a fractional portion of the of the nonwoven sheet average thickness.

In some embodiments, the mechanical force resulting from calendering is applied off of normal to the faces of the nonwoven sheet. Embodiments of utility include application of shear forces by methods such as: i) running a slight speed mismatch between steel calendering rolls creating scuffing/shear forces relative to both faces of the nonwoven sheet, ii) by texturing one calendering roll surface side relative to the other roll which can stretch/draw the nonwoven sheet and create fine, uniform three dimensional features, iii) by a compressible rubber layer on one calendering roll and non-deformable steel on other calendering roll, where the deformation of rubber layer provides a shear force, and iv) operating with a belt press with counter rotating treads that can be speed and material adjusted to provide both normal and shear forces at longer dwell times, and combinations thereof.

In some embodiments, calendering is carried out at a force applied to the faces of the nonwoven sheet of from about 500 pounds per linear inch (pli) (about 87 kN/m) to about 2,000 pli (about 350 kN/m). In some embodiments, calendering is carried out at a force applied to the faces of the nonwoven sheet of from about 1,000 pounds per linear inch (pli) (about 175 kN/m) to about 1,500 pli (263 kN/m).

In some embodiments, calendering is carried out at room temperature (e.g., about 25° C.). In some embodiments, calendering includes the use of elevated temperature achieved by circulating heat transfer fluid through the calender roll interior. In some embodiments, "elevated temperature" is meant a temperature greater than room temperature up to about 75° C. In some embodiments, "elevated temperature" is meant a temperature greater than room temperature up to about 50° C.

In some embodiments, calendering includes the use of a compliant rubber surface on at least one of the calender rolls. This allows for a more gradual application of force to the thicker regions of the nonwoven sheet through deformation of the compliant rubber calender roll at the nip region.

In some embodiments, calendering includes a plurality of calender rolls providing multiple nip points for the application of additional heat and pressure. Such calendering finds utility with stiffer nonwoven sheets that can require higher levels of uniformity in nonwoven sheet average thickness and nonwoven sheet thickness standard deviation.

Figure 2:
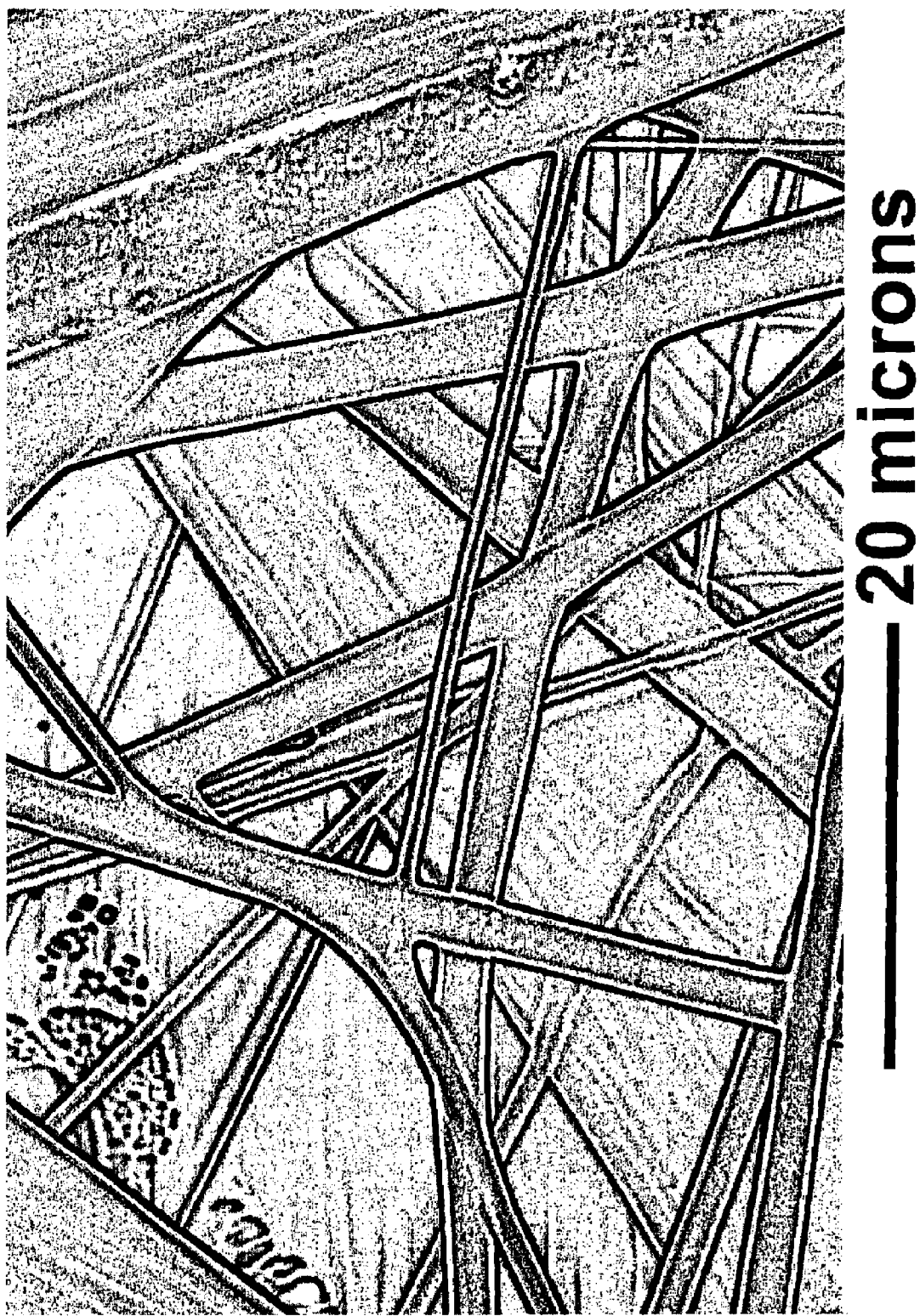
FIG. 2 is an illustration of a 2,000× magnification of a plan view of one embodiment of the described diffuse reflector comprising a consolidated nonwoven sheet comprising a plurality of plexifilamentary film-fibrils.
Figure 3:
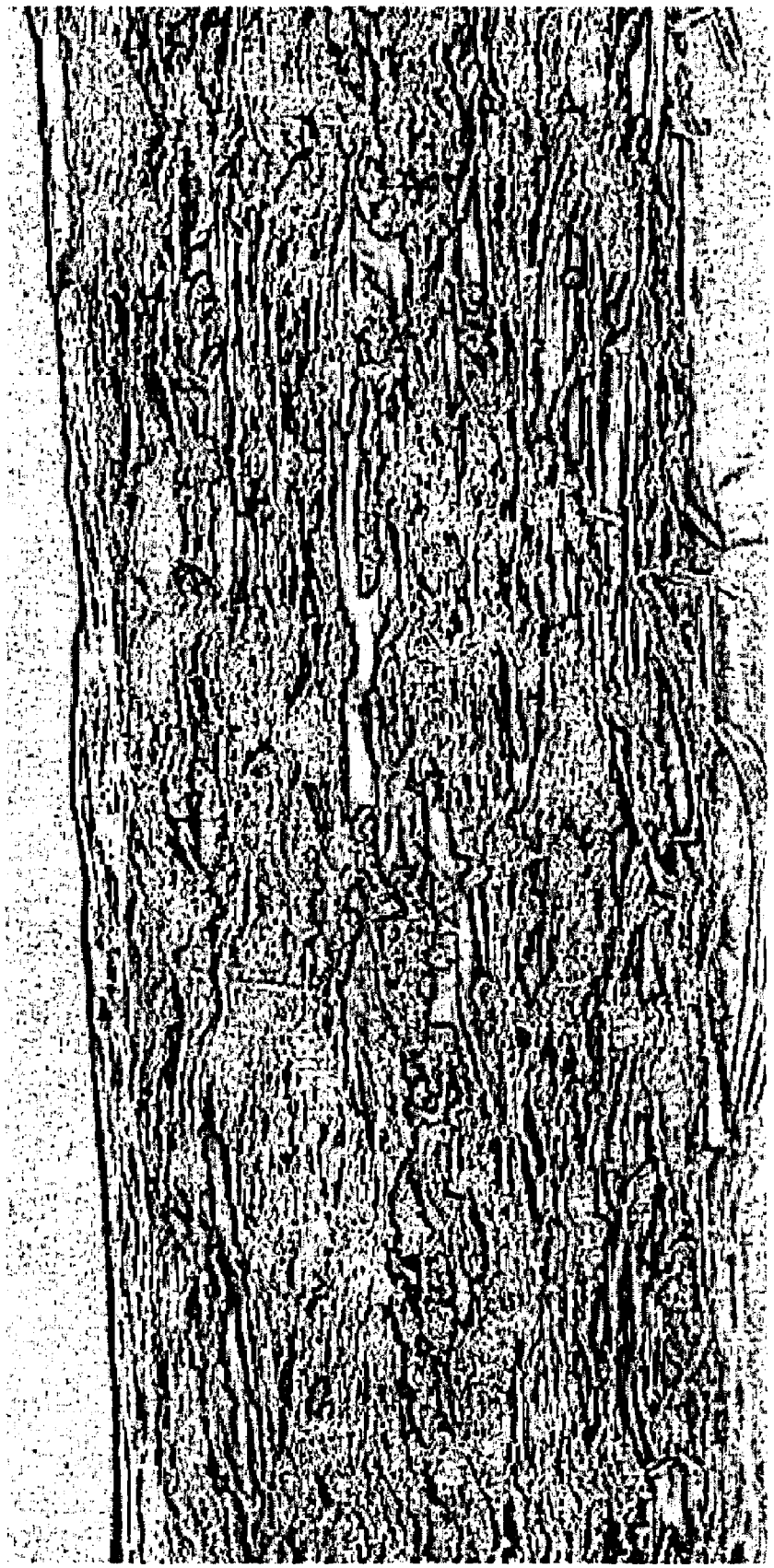
FIG. 3 is an illustration of a 300× magnification of a cross sectional view of one embodiment of the described diffuse reflector comprising a consolidated nonwoven sheet comprising a plurality of plexifilamentary film-fibrils.
Figure 4:
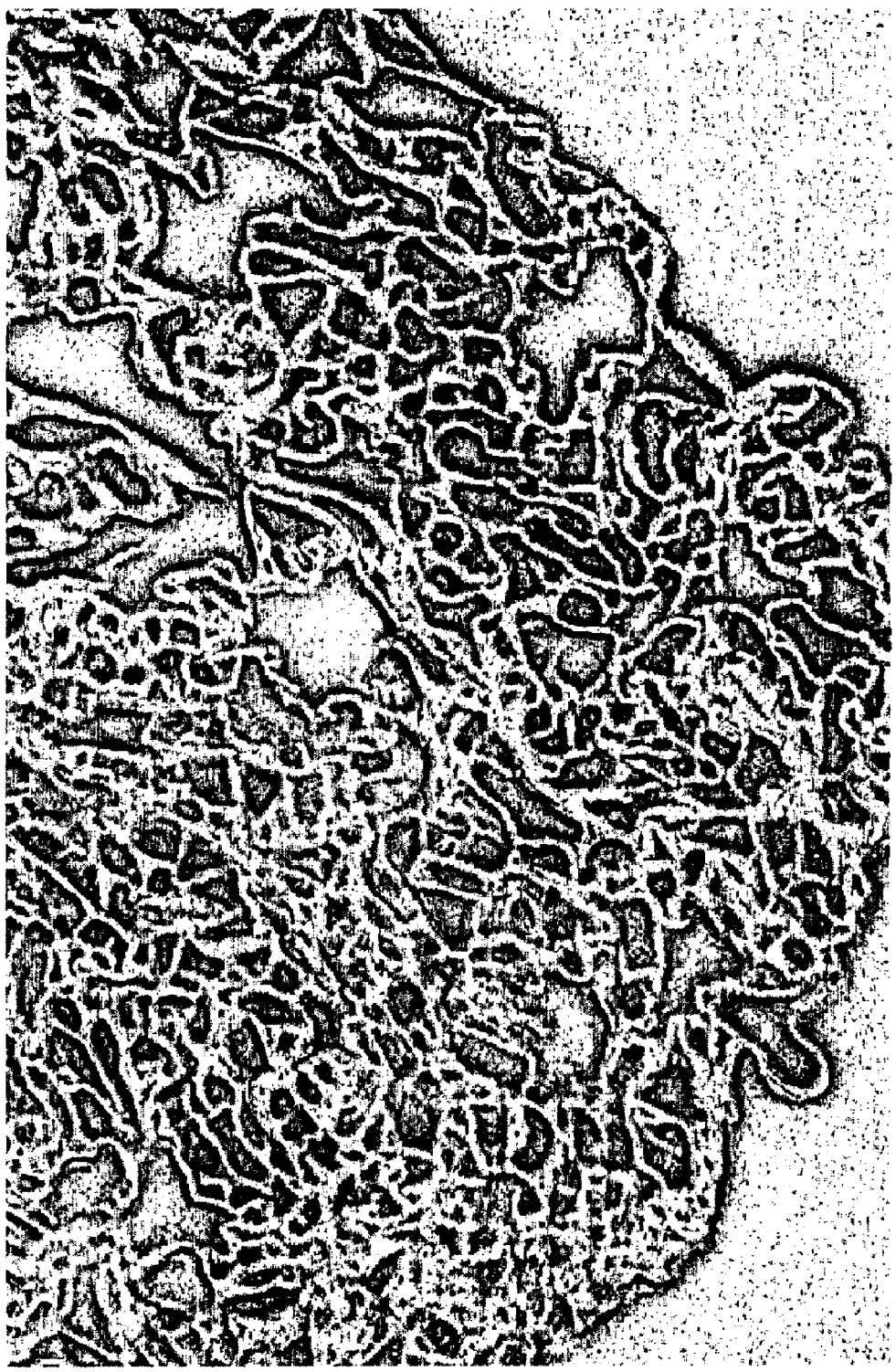
FIG. 4 is an illustration of a 10,000× magnification of a cross sectional view of a single plexifilamentary film-fibril.

The present inventors have discovered that applying a mechanical force as taught herein to a nonwoven sheet having a first average thickness, a first thickness standard deviation and a first photopic reflectance, forms a consolidated nonwoven sheet having a consolidated average thickness less than said first average thickness, a consolidated thickness standard deviation less than said first thickness standard deviation, and a consolidated photopic reflectance substantially identical to said first photopic reflectance without significantly altering the volume of nonwoven sheet intra-fiber pores and inter-fiber pores. For example, FIG. 2 includes as illustration a drawing of a 2,000× magnification of a plan view of a present diffuse reflector comprising a nonwoven sheet comprising a plurality of plexifilamentary film-fibrils and illustrates such inter-fiber pores. FIG. 3 includes as illustration a drawing of a 300× magnification of a cross sectional view of a present diffuse reflector comprising a nonwoven sheet comprising a plurality of plexifilamentary film-fibrils and illustrates such inter-fiber pores. FIG. 4 includes as illustration a drawing of a 10,000× magnification of a cross sectional view of a single plexifilamentary film-fibril and illustrates such intra-fiber pores. Nonwoven Sheet Nonwoven sheet and nonwoven web as used herein means a structure comprising individual fibers that are formed and then positioned in a random manner to form a planar material comprising the fibers without an identifiable pattern and without knitting or weaving. As used herein, the term fiber is intended to include all different types of fibrous materials that can be used to make nonwoven sheets. In some embodiments, of utility are staple fibers used for carding, wet-lay, air-lay and dry-forming; continuous or discontinuous filaments made by melt spinning, solution spinning, melt blowing; plexifilamentary film-fibrils obtained by flash spinning; fibrids prepared by fibridation processes, and combinations thereof. In some embodiments nonwoven sheets comprise spunbond webs, melt blown webs, multi-directional, multi-layer carded webs, air-laid webs, wet-laid webs, spunlaced webs, composite webs comprising more than one nonwoven sheet, and combinations thereof.

Nonwoven Sheet Comprising Flash-Spun Fibers

In some embodiments, nonwoven sheet comprises flash-spun fibers. In some embodiments, the term flash-spun fibers as used herein means fibers produced by the general process disclosed in U.S. Pat. No. 3,860,369.

In some embodiments, the term flash-spun fibers as used herein means fibers produced by the general process described below. In some embodiments, flash-spinning is conducted in a chamber, also referred to as a spin cell, which has a vapor-removal port and an opening through which nonwoven sheet material produced in the process is removed. Polymer solution is continuously or batchwise prepared at an elevated temperature and pressure and provided to the spin cell. The pressure of the polymer solution is greater than the cloud-point pressure, which is the lowest pressure at which the polymer is fully dissolved in the spin agent forming a homogeneous single phase mixture. The single phase polymer solution passes through a letdown orifice into a lower pressure chamber. In the lower pressure chamber, the solution separates into a two-phase liquid-liquid dispersion. One phase of the dispersion is a spin agent-rich phase which comprises primarily spin agent and the other phase of the dispersion is a polymer-rich phase which contains most of the polymer. This two phase liquid-liquid dispersion is forced through a spinneret into an area of much lower pressure where the spin agent evaporates very rapidly, and the polymer emerges from the spinneret as plexifilaments.

The term "plexifilamentary" or "plexifilaments" as used herein is intended to mean a three-dimensional integral network of a multitude of thin, ribbon-like, film-fibrils of random length and with a mean fibril thickness of less than about 4 μm and a median width of less than about 25 μm. In plexifilamentary structures, the film-fibrils are substantially coextensively aligned with the longitudinal axis of the structure and they intermittently unite and separate at irregular intervals in various places throughout the length, width and thickness of the structure to form a continuous three-dimensional network. Some embodiments are described in further detail in U.S. Pat. Nos. 3,081,519 and in U.S. Pat. No. 3,227,794.

In some embodiments, the plexifilaments are stretched in a tunnel and are directed to impact a rotating baffle. The rotating baffle has a shape that transforms the plexifilaments into a flat web, which in some embodiments is about 5 cm to about 15 cm wide, and separates the fibrils to open up the web. The rotating baffle further imparts a back and forth oscillating motion having sufficient amplitude to generate a wide back and forth swath. The web is laid down on a moving wire laydown belt located below the spinneret, and the back and forth oscillating motion is arranged to be generally across the belt to form the nonwoven sheet.

As the web is deflected by the baffle on its way to the moving belt, it enters a corona charging zone between a stationary multi-needle ion gun and a grounded rotating target plate. The multi-needle ion gun is charged to a DC potential by a suitable voltage source. The charged web is carried by a high velocity spin agent vapor stream through a diffuser consisting of two parts: a front section and a back section. The diffuser controls the expansion of the web and slows it down. Aspiration holes are drilled in the back section of the diffuser to assure adequate flow of gas between the moving web and the diffuser back section to prevent sticking of the moving web to the diffuser back section. The moving belt is grounded so that the charged web is electrostatically attracted to the belt and held in place thereon.

Overlapping web swaths from a multiplicity of plexifiliments are collected on the moving belt and held there by electrostatic forces and formed into the nonwoven sheet of the width desired with a thickness controlled by the belt speed. The sheet is then compressed between the belt and a roll into a structure having sufficient strength to be handled outside the chamber. The sheet is then collected outside the chamber on a windup roll.

In some embodiments, the sheet is bonded using methods known in art, such as thermal bonding. Thermal bonding relates to conventional processes in which at least one surface of a nonwoven sheet comprising polymer is heated, typically to a temperature at or slightly below the polymer melting point. Under such conditions, polymer at points of contact on the surface of separate fibers at the sheet surface will mix and form a bonding point (bond) which secures the fibers together. The contact time between a heat source (e.g., a heated roll) and the nonwoven sheet is very small because of the high speed of the thermal bonding step, such that only the surface fibrils of the nonwoven sheet reach a temperature close to the melting temperature of the polymer. This is indicated by the fibrils only at the surface of the resultant nonwoven sheet adhering together at bonding points between intersecting fibers.

Nonwoven Sheet Comprising Spunbond Fibers

In some embodiments, nonwoven sheets include those comprising spunbond fibers. The term "spunbond" fibers as used herein is intended to mean fibers that are melt-spun by extruding molten polymer as fibers from a plurality of fine, usually circular, capillaries of a spinneret with the diameter of the extruded fibers then being rapidly reduced by drawing and then quenching the fibers. In some embodiments, fiber cross-sectional shapes such as oval, tri-lobal, multi-lobal, flat, hollow, and the like are of utility. In some embodiments, spunbond fibers are substantially continuous and have an average diameter of greater than about 5 µm. In some embodiments, spunbond nonwoven webs are formed by laying spunbond fibers randomly on a collecting surface such as a screen or belt, and are bonded using methods known in art, such as thermal bonding.

Nonwoven Sheet Comprising Melt Blown Fibers

In some embodiments, nonwoven sheets include those comprising melt blown fibers. The term "melt blown" fibers as used herein is intended to mean fibers that are melt-spun and then attenuated by melt blowing, which comprises extruding a melt-processible polymer through a plurality of capillaries as molten streams into a high velocity gas (e.g., air) stream. The high velocity gas stream attenuates the streams of molten polymer to reduce their diameter and form melt blown fibers in some embodiments having a diameter between about 0.5 µm and about 10 µm. In some embodiments, melt blown fibers are discontinuous fibers. In some embodiments, melt blown fibers are continuous fibers. In some embodiments, melt blown fibers carried by the high velocity gas stream are deposited on a collecting surface to form a melt blown web of randomly dispersed fibers. In some embodiments, melt blown webs are bonded using methods known in the art, such as thermal bonding.

Nonwoven Sheet Polymer

Polymers from which nonwoven sheets can be made include polyolefin (e.g., polyethylene, polypropylene, polymethylpentene and polybutylene), acrylonitrile-butadiene-styrene (ABS) resin, polystyrene, styrene-acrylonitrile, styrene-butadiene, styrene-maleic anhydride, vinyl plastic (e.g., polyvinyl chloride (PVC)), acrylic, acrylonitrile-based resin, acetal, perfluoropolymer, hydrofluoropolymer, polyamide, polyamide-imide, polyaramid, polyarylate, polycarbonate, polyesters, (e.g., polyethylene napthalate (PEN)), polyketone, polyphenylene ether, polyphenylene sulfide, polysulfone and mixtures thereof.

In the context of polymers from which nonwoven sheets can be made, the term polyolefin as used herein is intended to mean any of a series of largely saturated open chain polymeric hydrocarbons consisting of carbon and hydrogen. Typical polyolefins include, but are not limited to, polyethylene, polypropylene, polymethylpentene, and mixtures thereof.

In the context of polymers from which nonwoven sheets can be made, the term polyethylene as used herein includes not only homopolymers of ethylene, but also copolymers. In some embodiments, at least 85% of the recurring units arise from ethylene. In some embodiments, the polyethylene is linear high density polyethylene having an upper limit of melting range of about 130° to about 137° C., a density in the range of about 0.94 to about 0.98 g/cm$^3$ and a melt index (as defined by ASTM D-1238-57T, Condition E) of between about 0.1 to about 100. In some embodiments, said melt index is between 0.1 and 4.

In some embodiments, nonwoven sheets comprise a sheet of flash-spun plexifilamentary film-fibrils, wherein the fibrils comprise polymer containing pores. In some embodiments, the polymer comprises polyolefin. In some embodiments, the polymer comprises polyethylene.

Nonwoven Sheet Fiber Pores

In some embodiments, diffuse reflectance of visible light by nonwoven sheets of utility in diffuse reflectors arises from a combination of light scattering from pores created by fiber interstices, and light scattering from pores within the fibers. In some embodiments, nonwoven sheets contain a plurality of pores that are defined herein as intra-fiber pores or inter-fiber pores. Intra-fiber pores are randomly distributed throughout the interior of a fiber and have a mean pore diameter as measured by mercury porosimetry ranging from about 0.02 µm to about 0.5 µm. Inter-fiber pores are randomly distributed interstices between fibers in a nonwoven sheet and have a mean pore diameter as measured by mercury porosimetry ranging from about 0.5 µm to about 9 µm. In some embodiments, the visible light scattering cross section per unit pore volume, and thus diffuse reflectance, of nonwoven sheets is maximized for pores having a mean pore diameter of from about 0.2 µm to about 0.4 µm. In some embodiments, about one third of the light scattering by nonwoven sheets of utility in diffuse reflectors arises from inter-fiber pores having a mean pore diameter of about 1 µm and larger, and that about two thirds of the light scattering arises from the intra-fiber pores and inter-fiber pores having a mean pore diameter of less than about 1 µm.

"Specific pore volume" (also referred to herein as "SPV") is herein defined as the mathematical product of the nonwoven sheet average basis weight, in units of g/m$^2$, times pore volume, in units of cm$^3$/g, for a given mean pore diameter range. SPV has units of cm$^3$/m$^2$, and is a unit characterizing the volume of pores for a given mean pore diameter range that exists per square area of nonwoven sheet. Average basis weight is measured by the procedure of ASTM D3776, modified as appropriate for nonwoven sheet size. Nonwoven sheet pore volume for a given mean pore diameter range is obtained by known mercury porosimetry methodology as disclosed by H. M. Rootare in "A Review of Mercury Porosimetry" from Advanced Experimental Techniques in Powder Metallurgy, pp. 225-252, Plenum Press, 1970. "VP1" is herein defined as the volume of nonwoven sheet pores as measured by mercury porosimetry having a mean pore diameter of from 0.01 µm to 1.0 µm. "VP2" is herein defined as the volume of nonwoven sheet pores as measured by mercury porosimetry having a mean pore diameter of from 0.02 µm to 0.5 µm. SPV1 is herein defined as the specific pore volume relating to the VP1 mean pore diameter range, and SPV2 is herein defined as the specific pore volume relating to the VP2 mean pore diameter range.

A plot of nonwoven sheet photopic reflectance (%) of visible light by the Spectrophotometer Method (defined in the present Examples section) versus specific pore volume (SPV) yields a smooth curve for nonwoven sheets of utility in present diffuse reflectors. In some embodiments, SPV1 of about 10 cm$^3$/m$^2$ results in a photopic reflectance of visible light by the Spectrophotometer Method of at least about 85% for the nonwoven sheet. In some embodiments, SPV1 of about 20 cm$^3$/m$^2$ results in a photopic reflectance by the Spectrophotometer Method of at least about 90%. In some embodiments, SPV1 of about 30 cm$^3$/m$^2$ results in a photopic reflectance by the Spectrophotometer Method of at least about 92%. In some embodiments, SPV1 of about 40 cm$^3$/m$^2$ results in a photopic reflectance by the Spectrophotometer Method of at least about 94%. In some embodiments, SPV1 of about 50 cm$^3$/m$^2$ results in a photopic reflectance by the Spectrophotometer Method of at least about 96%.

Intra-fiber pores have a high scattering cross section per unit pore volume, and thus are substantially responsible for the high light scattering, and thus high diffuse reflectance, of nonwoven sheets of utility in present diffuse reflectors. In some embodiments, nonwoven sheets contain a plurality of intra-fiber pores, and SPV2 of about 7 cm$^3$/m$^2$ results in a photopic reflectance of visible light by the Spectrophotometer Method of at least about 85% for the nonwoven sheet. In some embodiments, SPV2 of about 16 cm$^3$/m$^2$ results in a photopic reflectance by the Spectrophotometer Method of at least about 90%. In some embodiments, SPV2 of about 25 cm$^3$/m$^2$ results in a photopic reflectance by the Spectrophotometer Method of at least about 92%. In some embodiments, SPV2 of about 30 cm$^3$/m$^2$ results in a photopic reflectance by the Spectrophotometer Method of at least about 94%. In some embodiments, SPV2 of about 40 cm$^3$/m$^2$ results in a photopic reflectance by the Spectrophotometer Method of at least about 96%.

In some embodiments, nonwoven sheets of utility in present diffuse reflectors contain a plurality of pores, wherein SPV1 is at least about 10 cm$^3$/m$^2$, resulting in a photopic reflectance of visible light by the Spectrophotometer Method of at least about 85% for the nonwoven sheet. In some embodiments, SPV1 is at least about 20 cm$^3$/m$^2$. In some embodiments SPV1 is at least about 30 cm$^3$/m$^2$. In some embodiments SPV1 is at least about 40 cm$^3$/m$^2$. In some embodiments SPV1 is at least about 50 cm$^3$/m$^2$. In some embodiments, intra-fiber pore related SPV2 is at least about 7 cm$^3$/m$^2$, resulting in a photopic reflectance by the Spectrophotometer Method of at least about 85%. In some embodiments, SPV2 is at least about 16 cm$^3$/m$^2$. In some embodiments, SPV2 is at least about 25 cm$^3$/m$^2$. In some embodiments, SPV2 is at least about 30 cm$^3$/m$^2$. In some embodiments, SPV2 is at least about 40 cm$^3$/m$^2$.

Nonwoven Sheet Thermal Bonding

The photopic reflectance of nonwoven sheets of utility in present diffuse reflectors decreases with increased thermal bonding. Thermal bonding undesirably reduces the volume of nonwoven sheet intra-fiber pores having a high scattering cross section per unit pore volume that contribute substantially to diffuse reflectance. Thermal bonding also undesirably reduces the volume of nonwoven sheet inter-fiber pores that also contribute to the diffuse reflectance. In some embodiments, nonwoven sheet of utility in present diffuse reflectors are not thermal or otherwise bonded. In some embodiments, nonwoven sheet can contain a minimal degree of thermal bonding on the nonwoven sheet surface necessary to maintain structural integrity of the sheet during diffuse reflector handling and use.

In some embodiments, plexifilamentary film-fibril polyolefin nonwoven sheets of utility in present diffuse reflectors will have maximal volume of inter-fiber and intra-fiber pores, and thus high photopic reflectance, and maintain sufficient structural integrity during diffuse reflector handling and use, if thermal bonding of the nonwoven sheet is carried out such that the bonded sheet has a delamination value of about 7.1 kg/m (0.4 lb/in) or less. In some embodiments, thermal bonding of the nonwoven sheet is carried out such that the bonded sheet has a delamination value of about 5.3 kg/m (0.3 lb/in) or less. In some embodiments, thermal bonding of the nonwoven sheet is carried out such that the bonded sheet has a delamination value of about 5.0 kg/m (0.28 lb/in) or less. In some embodiments, thermal bonding of the nonwoven sheet is carried out such that the bonded sheet has a delamination value of about 1.8 kg/m (0.1 lb/in) or less. Delamination is a measurement reported in units of force/length (e.g., kg/m) defined by ASTM D 2724 and relates to the extent of bonding in certain types of sheet, for example bonding in nonwoven sheet made from plexifilamentary film-fibrils.

In some embodiments, the diffuse reflector comprising a consolidated nonwoven sheet having a thickness standard deviation of about 15 μm or less and a photopic reflectance of at least about 94% over the wavelength range of 380 nm to 780 nm is produced by applying mechanical force to a nonwoven sheet. In one embodiment the diffuse reflector is formed by applying mechanical force (e.g., calendering) to a nonwoven web to form a calendered nonwoven web, followed by bonding of the calendered nonwoven web. This embodiment is of utility for forming very uniformly bonded and strong (e.g., delamination value of about 5.0 kg/m (0.28 lb/in)) diffuse reflectors. In another embodiment the diffuse reflector is formed by bonding a nonwoven web to form a bonded nonwoven web, followed by applying mechanical force (e.g., calendering) to the bonded nonwoven web.

Nonwoven Sheet Polymer Refractive Index

The scattering and diffuse reflection of light by nonwoven sheets of utility in present diffuse reflectors is due to reflection of light at air-polymer interfaces of the inter-fiber and intra-fiber pores. Reflection will increase with an increase in the difference between the refractive index of the pore phase (air, refractive index of 1.0) and the refractive index of the fiber polymer phase. An increase in light scattering is observed when the difference in refractive index between two phases is greater than about 0.1. In some embodiments, polymer comprising the nonwoven sheet fibers has a high refractive index (for example polyethylene, refractive index of 1.51) and low absorption of visible light.

Nonwoven Sheet Polymer Absorption Coefficient

The diffuse reflectance exhibited by nonwoven sheets of utility in diffuse reflectors produced by the present method is a result of their high light scattering ability. However, high photopic reflectance of the nonwoven sheets is achieved by a combination of high light scattering ability together with very low absorption of visible light. In some embodiments, nonwoven sheets of utility in present diffuse reflectors have very low absorption of visible light. In some embodiments, nonwoven sheets of utility in present diffuse reflectors do not absorb visible light. To avoid negative effects of light absorption, in some embodiments nonwoven sheets have an absorption coefficient of visible light less than about $10^{-4}$ μm$^{-1}$. In some embodiments nonwoven sheets have an absorption coefficient of visible light less than about $10^{-5}$ μm$^{-1}$. In some embodiments, polymers of utility for forming present nonwoven sheets have an absorption coefficient of about $10^{-4}$ m$^2$/g or less. In some embodiments, polymers of utility for forming present nonwoven sheets have an absorption coefficient of about $10^{-5}$ m$^2$/g or less. In some embodiments, polymers of utility for forming present nonwoven sheets have an absorption coefficient of about $10^{-6}$ m$^2$/g or less.

Nonwoven Sheet Thickness

In some embodiments, nonwoven sheets comprise a nonwoven sheet laminate having a first average thickness of from about 20 µm to about 1,000 µm. In some embodiments, nonwoven sheets comprise a nonwoven sheet laminate having a first average thickness of less than about 250 µm. In some embodiments, nonwoven sheets comprise a nonwoven sheet laminate having a first average thickness from about 70 µm to about 150 µm.

In some embodiments, nonwoven sheets comprise a single nonwoven sheet having a first average thickness of from about 150 µm to about 400 µm. In some embodiments, nonwoven sheets comprise a single nonwoven sheet having a first average thickness of about 250 µm. In some embodiments, nonwoven sheets comprise a single nonwoven sheet having a first average thickness of from about 150 µm to about 200 µm.

Nonwoven Sheet Particulate Filler

In some embodiments, nonwoven sheets of utility in present diffuse reflectors can further comprise particulate filler dispersed in the polymer phase forming the nonwoven sheet fibers. In some embodiments, nonwoven sheet particulate fillers have a refractive index larger than that of the nonwoven sheet polymer and thus light scattering of the nonwoven sheet will increase with an increase in the difference between the refractive index of the particulate filler and the refractive index of the fiber polymer phase. In some embodiments, nonwoven sheet particulate fillers have a high refractive index, high light scattering cross section and low absorption of visible light. Nonwoven sheet particulate filler enhances light scattering and provides higher photopic reflectance for a given nonwoven sheet average thickness. Nonwoven sheet particulate fillers can be any shape. In some embodiments, nonwoven sheet particulate fillers have a mean diameter of from about 0.01 µm to about 1 µm. In some embodiments, nonwoven sheet particulate fillers have a mean diameter of from about 0.2 µm to 0.4 µm. In some embodiments, nonwoven polymer sheets containing nonwoven sheet particulate filler comprise at least about 50% by weight polymer, and nonwoven sheet particulate filler comprises from about 0.05 weight % to about 50 weight %, based on the weight of the polymer. In some embodiments, nonwoven sheet particulate filler comprises from about 0.05 weight % to about 15 weight %, based on the weight of the polymer. Example nonwoven sheet particulate fillers include silicates, alkali metal carbonates, alkali earth metal carbonates, alkali metal titanates, alkali earth metal titanates, alkali metal sulfates, alkali earth metal sulfates, alkali metal oxides, alkali earth metal oxides, transition metal oxides, metal oxides, alkali metal hydroxides, alkali earth metal hydroxides and mixtures thereof. Specific examples include titanium dioxide, calcium carbonate, clay, mica, talc, hydrotalcite, magnesium hydroxide, silica, silicates, hollow silicate spheres, wollastonite, feldspar, kaolin, magnesium carbonate, barium carbonate, magnesium sulfate, barium sulfate, calcium sulfate, aluminum hydroxide, calcium oxide, magnesium oxide, alumina, asbestos powder, glass powder, zeolite and mixtures thereof. Known methods can be used to make nonwoven sheets containing particulate filler, such as those disclosed in U.S. Pat. No. 6,010,970 and PCT publication number WO2005/98,119.

Nonwoven Sheet Having a Binder Layer Containing Light Scatterer

In some embodiments, the nonwoven sheet further comprises on at least one face thereof a binder layer comprising a binder and a scatterer of visible light dispersed in the binder. Binder as used herein is intended to mean a continuous solid phase that functions to maintain scatterer in a dispersed state in close proximity to the nonwoven sheet. Scatterer as used herein is intended to mean a material that functions to scatter visible light. In some embodiments, scatterer is in a dispersed state throughout the binder. In some embodiments, each scatterer is surrounded by binder and not in physical contact with other scatterers. In some embodiments, scatterers include particles (herein alternately referred to as particulate scatterer) and voids.

In some embodiments, the binder layer functions as an adhesive to adhere adjacent nonwoven sheets together in a face to face orientation. In some embodiments, the binder layer functions to increase the photopic reflectance of the diffuse reflector. In some embodiments, the binder layer functions as an adhesive and to increase the photopic reflectance of the diffuse reflector. In some embodiments, a binder layer adheres a nonwoven sheet to another substrate in a face to face orientation. In some embodiments, nonwoven sheet can have a binder layer on each nonwoven sheet face.

In some embodiments the binder layer has a thickness of from about 5 µm to about 100 µm. In some embodiments the binder layer has a thickness of from about 5 µm to about 25 µm.

In some embodiments, binder has a low absorption of visible light. In some embodiments, binder does not absorb visible light. In some embodiments, binder has an absorption coefficient of about $10^{-3}$ $m^2/g$ or less. In some embodiments, binder has an absorption coefficient of about $10^{-5}$ $m^2/g$ or less. In some embodiments, binder has an absorption coefficient of about $10^{-6}$ $m^2/g$ or less.

In some embodiments binder comprises polymer. In some embodiments binder comprises mixtures of polymers. In some embodiments polymeric binder is thermosetting polymers such as polyester, resorcinol and phenolresorcinol formaldehyde, epoxy, polyurethane, acrylic and mixtures thereof. In some embodiments polymeric binder is thermoplastic polymers such as cellulose acetate and cellulose acetate butyrate, polyvinyl acetate, vinyl vinylidene, acrylic, vinyl/acrylic, polyamide, phenoxy, fluoropolymer and mixtures thereof. In some embodiments polymeric binder is elastomeric polymers such as polyisobutylene, nitrile, styrene butadiene, polysulfide, silicone, neoprene and mixtures thereof. In some embodiments polymeric binder is hybrid modified polymers such as epoxy-phenolic, epoxy-polysulfide, epoxy-nylon, nitrile-phenolic, neoprene-phenolic, rubber modified epoxy, rubber modified acrylic, epoxy urethane and mixtures thereof. In some embodiments, the glass transition temperature ($T_g$) of polymeric binder is generally in the range of from −75 to 30° C. Polymeric binder having a $T_g$ below −75° C. typically has poor cohesive strength. Consequently, the surface of the binder layer can become tacky, causing the binder layer to become soiled or even delaminate from the nonwoven sheet. Polymeric binder having $T_g$ exceeding 30° C. typically exhibits brittleness and unacceptable adhesion to the nonwoven sheet, causing the binder layer to be easily cracked or delaminate from the nonwoven sheet when the diffuse reflector is flexed or while applying mechanical force to the nonwoven sheet. In some embodiments polymeric binders include polyesters such as polyethylene terephthalate and polybutylene terephthalate, polyacrylics such as polymethyl acrylate, polyethyl acrylate and polymethyl methacrylate, silicones and mixtures thereof.

In some embodiments, the difference between the refractive index of the scatterer and the binder is at least about 0.5. In some embodiments, the difference between the refractive index of the scatterer and the binder is at least about 1.

In some embodiments, high refractive index particulate scatterer is present in the binder in an amount below the critical particle volume concentration (herein alternately referred to as CPVC), such that the binder layer is substantially free of voids. In some embodiments, high refractive index particulate scatterer is present in the binder in an amount greater than the CPVC, such that the binder layer contains voids. In some embodiments, low refractive index particulate scatterer is present in the binder in an amount greater than the CPVC, such that the binder layer contains voids. In some embodiments, a mixture of high refractive index particulate scatterer and low refractive index particulate scatterer is present in the binder in an amount either above or below the CPVC, such that the binder layer is either substantially free of, or contains, voids.

In some embodiments, the scatterer mean diameter is from about 0.1 μm to about 30 μm. In some embodiments, the scatterer mean diameter is from about 0.2 μm to about 1 μm. In some embodiments, the scatterer mean diameter is from about 0.2 μm to about 0.4 μm.

In some embodiments particulate scatterer has low absorption of visible light. By low absorption is meant that scatterer has lower absorption than binder or does not substantially contribute to the absorption of the binder layer. In some embodiments the binder layer comprising binder and scatterer has an absorption coefficient of about $10^{-3}$ $m^2/g$ or less. In some embodiments the absorption coefficient is about $10^{-5}$ $m^2/g$ or less. In some embodiments where scatterer comprises titanium dioxide, the absorption coefficient of the binder layer comprising binder and scatterer is about $10^{-3}$ $m^2/g$ or less at wavelengths from about 425 nm to about 780 nm. In some embodiments where scatterer comprises titanium dioxide, the absorption coefficient of the binder layer comprising binder and scatterer is about $10^{-5}$ $m^2/g$ or less at wavelengths from about 425 nm to about 780 nm.

In some embodiments the composition of particles of utility as scatterer is not particularly limited, and includes metal salts, metal hydroxides, metal oxides and mixtures thereof. In some embodiments, scatterer comprises: metal salts such as barium sulfate, calcium sulfate, magnesium sulfate, aluminum sulfate, barium carbonate, calcium carbonate, magnesium chloride, magnesium carbonate; metal hydroxides such as magnesium hydroxide, aluminum hydroxide and calcium hydroxide; and metal oxides such as calcium oxide, magnesium oxide, alumina and silica; and mixtures thereof. In some embodiments, clays such as kaolin, aluminasilicates, calcium silicate, cements, zeolites, talc and mixtures thereof are also of utility. In some embodiments scatterer comprises plastic pigments. In some embodiments scatterer comprises high refractive index particulate scatterer. In some embodiments scatterer comprises white pigment particles. In some embodiments scatterer comprises titanium dioxide, zinc oxide and mixtures thereof.

Nonwoven sheet with optional binder layer can be manufactured by a method comprising the steps of: preparing a mixture comprising binder, scatterer and optionally diluent, coating the mixture onto at least one face of a nonwoven sheet, and optionally curing the mixture to form the binder layer.

Mixtures comprising binder and scatterer can be prepared by weighing and combining the appropriate amounts of each (e.g., as a finely divided powder, pellets, solution, dispersion or other state), and mixing using conventional apparatus (e.g., with a Banbury mixer).

Coating of the binder and scatterer mixture onto at least one face of a nonwoven sheet can be carried out by various known methods. For example, application methods such as the bar coating method, roll coating method, spray coating method and dip coating method, entire surface printing methods such as silkscreen printing, offset printing, gravure printing and flexographic printing, and molding methods such as extrusion molding method.

The optional curing step involves curing the mixture to form the binder layer. This step is necessary when the binder and scatterer composition contains a solvent (e.g., such as when polymer binder comprises an acrylic latex) and is carried out by allowing the coated nonwoven sheet to rest an appropriate amount of time under ambient or other conditions (e.g., elevated temperature, decreased pressure, etc.) until the solvent has evaporated from the composition leaving the binder layer deposited on the nonwoven sheet.

UV Stabilizer

In some embodiments, present nonwoven sheet diffuse reflectors can further comprise ultraviolet (UV) stabilizer, which is a substance coating, or dispersed throughout the polymer phase of, the nonwoven sheet fibers to prevent photodeterioration by UV light. In some embodiments, the binder layer can contain UV stabilizer. In some embodiments, concentration of UV stabilizer is from about 0.01 weight % to about 5.0 weight %, based on the weight of the nonwoven sheet polymer or binder. Conventional UV stabilizers of known utility in plastics can be used. In some embodiments, UV stabilizer is selected from benzophenones, hindered tertiary amines, benzotriazoles, hydroxyphenyl triazines and mixtures thereof. Commercial UV stabilizers of utility include the CHIMASSORB® and TINUVIN® families of stabilizers sold by Ciba Specialty Chemicals, Tarrytown, N.Y., USA.

Backing Support Sheet

In some embodiments, present diffuse reflectors can further comprise backing support sheet to maintain the shape of the diffuse reflector during diffuse reflective article assembly and use. Such backing support sheet is positioned on the face of the diffuse reflector facing away from the light source. Backing support sheet materials of utility include polyester films (e.g., Mylar®), aramid fiber (e.g., KEVLAR®), both available from E. I. du Pont de Nemours & Co., Wilmington, Del., USA, as well as paper, fabric or wovens, nonwoven sheets, foamed polymer, polymer films, metal foil or sheet, metallized film and mixtures thereof. Backing support sheet and diffuse reflector can be laminated to one another with the aforementioned binder layer or conventional pressure-sensitive adhesives by conventional techniques.

Specular Reflective Layer

In some embodiments, present diffuse reflectors can further comprise a specular reflective layer positioned on the face of the nonwoven sheet facing away from the light source. Positioning a specular reflector as such increases the photopic reflectance of the diffuse reflector. In some embodiments, the binder layer face of a nonwoven sheet containing a binder layer on one face can be metallized. Representative metals include aluminum, tin, nickel, iron, chromium, copper, silver or alloys thereof, with aluminum preferred. In some embodiments, metals are deposited by known vacuum metallization techniques in which metal is vaporized by heat under vacuum, and then deposited on the binder layer face in a thickness from about 75 angstroms to about 300 angstroms. Vacuum metallization is known, for example in U.S. Pat. No. 4,999,222. In such embodiments, a thin specular reflecting layer is added to the binder layer face of the diffuse reflector without substantially changing the overall thickness of the reflector. In some embodiments, the specular reflective layer comprises a metallized polymer sheet, for example aluminized MYLAR®, which can be laminated to a diffuse reflector, with a metallized face of the metallized polymer sheet facing the binder layer face of a nonwoven sheet containing a binder layer on one face. In some embodiments, the specular reflective layer comprises a metal foil, for example aluminum foil, which can be laminated to the binder layer face of a nonwoven sheet containing a binder layer on one face, resulting in a stiffened diffuse reflector. The diffuse reflectors of this embodiment can be formed by laminating a metal foil to the binder layer face of a nonwoven sheet containing a binder layer on one face by using the binder layer as adhesive or by using conventional pressure sensitive adhesives. In embodiments where a diffuse reflector contains a metallized face or is laminated to a metallized polymer sheet or metal foil, the remaining (metal-free) nonwoven face of the diffuse reflector is positioned in the optical cavity facing the light source.

Method of Improving Light Reflectivity

Further included is a method of improving light reflectivity in a device requiring diffuse reflectivity of light comprising: (i) providing a diffuse reflector comprising a consolidated nonwoven sheet having a thickness standard deviation of about 15 μm or less and a photopic reflectance of at least about 94% over the wavelength range of 380 nm to 780 nm; and (ii) positioning said diffuse reflector within said device to cause light energy to reflect off of said diffuse reflector.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Unless otherwise defined, all technical and scientific terms used herein have the same meaning as commonly understood by one of ordinary skill in the art to which this invention belongs. Although methods and materials similar or equivalent to those described herein can be used in the practice or testing of embodiments of the present invention, suitable methods and materials are described below. All publications, patent applications, patents, and other references mentioned herein are incorporated by reference in their entirety, unless a particular passage is cited. In case of conflict, the present specification, including definitions, will control. In addition, the materials, methods, and examples are illustrative only and not intended to be limiting.

To the extent not described herein, many details regarding specific materials and processing acts are conventional and may be found in textbooks and other sources within the calendering, nonwovens, and optical display member arts.

EXAMPLES

The concepts described herein will be further described in the following examples, which do not limit the scope of the invention described in the claims.

Basis Weight

Nonwoven sheet basis weight is measured by the method of ASTM D 3776, modified for specimen size, and is reported in units of $g/m^2$.

Mercury Porosimetry

Nonwoven sheet pore size distribution data are obtained by known mercury porosimetry methodology as disclosed by H. M. Rootare in "A Review of Mercury Porosimetry" from Advanced Experimental Techniques in Powder Metallurgy, pp. 225-252, Plenum Press, 1970. "VP1" as hereinbefore defined is the volume of nonwoven sheet pores as measured by mercury porosimetry having a mean pore diameter of from 0.01 μm to 1.0 μm. "VP2" as hereinbefore defined is the volume of nonwoven sheet pores as measured by mercury porosimetry having a mean pore diameter of from 0.02 μm to 0.5 μm.

Specific Pore Volume

Specific pore volume (in units of $cm^3/m^2$, also referred to herein as "SPV") as hereinbefore defined is the mathematical product of the nonwoven sheet basis weight (in units of $g/m^2$) and the sheet pore volume (in units of $cm^3/g$) for pores of a given mean pore diameter range. SPV1 as hereinbefore defined is the specific pore volume relating to the VP1 mean pore diameter. SPV2 as hereinbefore defined is the specific pore volume relating to the VP2 mean pore diameter.

Average Thickness

Thickness measurements are made with an Ono Sokki EG-225 thickness gauge with a 0.95 cm (3/8 inch) measurement probe affixed to a Ono Sokki ST-022 ceramic base gauge stand, both available from Ono Sokki, Addison, Ill., USA. A square piece of sheet is cut noting the machine direction & transverse direction orientations. A series of evenly 2.54 cm spaced measurements are made around the outer boundary of the sample 1.3 cm to 2.54 cm in from the cut edges. This series of values provides the average thickness and standard deviation for the sample.

Delamination

Delamination values for nonwoven sheets are obtained by the method of ASTM D2724, and reported in units of kg/m.

Reflectance Spectra—Spectrophotometer Method

Total reflectance spectra are obtained by the method of ASTM E1164-02 (Standard Practice for Obtaining Spectrophotometric Data for Object-Color Evaluation). A sample needing measurement is placed in a Lambda 650 UV/VIS/NIR Spectrometer with a 150 mm integrating sphere attachment, both available from PerkinElmer, Wellesley, Mass., USA. Diffuse reflectors produced by the present method are placed in the spectrometer with a nonwoven face of the diffuse reflector facing the spectrometer light source. The output is a percent reflectance at each wavelength and the spectral range measured is 380 nm to 780 nm in 5 nm intervals. The reflectance standard is a calibrated SPECTRALON® standard purchased from LabSphere, North Sutton, N.H., USA. Photomultiplier detection is used. Tristimulus values are calculated by the method of ASTM E308-01 using the CIE 10° 1964 standard observer and illuminant D65. The photopic reflectance, $R_{VIS}$, is calculated using illuminant D65 and the CIE Standard Photopic observer described in "Billmeyer and Saltzman Principles of Color Technology", $3^{rd}$ Edition.

Nonwoven Sheet A

Described here is the nonwoven sheet (nonwoven sheet A) from which the EX. 1-A consolidated nonwoven sheet is produced by the present method.

The nonwoven sheet is a single sheet of flash-spun high density polyethylene (HDPE) comprising a plurality of plexifilamentary film-fibrils of HDPE. The nonwoven sheet is produced by the general process disclosed in U.S. Pat. Nos. 3,081,519, 3,227,794 and 3,860,369.

This general process for producing the nonwoven sheet can be summarized as three steps. Step one is spinning. A solution of high density polyethylene (HDPE) with either CFC-11 (fluorotrichloromethane) or C-5 hydrocarbons is subjected to two pressure reductions. The first results in a two-phase liquid solution. The second, to atmospheric pressure, results in the flash evaporation of the non-polymer component leaving an interconnected web of solid HDPE. A series of webs are collected on a paper machine and wound into rolls.

Step two is thermal area bonding. The rolled webs are unwound and each web surface is brought into contact with a steam heated drum. The temperature of the heated drum is 135-140° C., and the melting temperature of the HDPE from which the web is made is 135-138° C. The contact time between the heated drum and the web is brief, with the result that only the surface fibrils of the web reach a temperature close to the melting temperature of the HDPE, as indicated by the fibrils only at the surface of the resultant nonwoven sheet adhering together at contact points between intersecting fibrils. To prevent the nonwoven sheet from shrinking excessively, a blanket holds the nonwoven sheet against the drum surface effectively restraining it. Each nonwoven sheet surface is cooled by contact with a chilled drum immediately after leaving the steam heated drum. After thermal area bonding the nonwoven sheet can be corona treated on none, one or both sides and have antistat agent applied to none, one or both sides. The product is then wound into rolls.

Step three is the slitting step. The product is slit to a desired width and wound into rolls of a desired length.

Multiple (i.e., at least twelve) 34 mm×34 mm square nonwoven sheet samples are cut from different areas of a continuous nonwoven sheet. The average thickness of each nonwoven sheet sample is measured by the aforementioned Average Thickness method and averaged by the number of nonwoven sheet samples to determine an average thickness of 208 μm and thickness standard deviation of 25 μm. Basis weight of each nonwoven sheet sample is determined by the aforementioned Basis Weight method and averaged by the number of nonwoven sheet samples to determine an average basis weight of 70 g/m². A total reflectance spectrum is obtained for each nonwoven sheet sample by the aforementioned Spectrophotometer Method and the $R_{VIS}$ value calculated. The nonwoven sheet sample spectra are averaged to determine an average $R_{VIS}$ of 94.45%. The delamination value for the nonwoven sheet is measured by the aforementioned Delamination method to be 5.2 kg/m. VP1 and VP2 of the nonwoven sheet are determined by the aforementioned Mercury Porosimetry method to be 0.55 cm³/g (VP1) and 0.41 cm³/g (VP2). Specific pore volumes SPV1 and SPV2 are calculated as previously described to be 39 cm³/m² (SPV1) and 29 cm³/m² (SPV2).

Nonwoven Sheet B

Described here is the nonwoven sheet (nonwoven sheet B) from which the EX. 1-B consolidated nonwoven sheet is produced by the present method.

The slot die coating head method is used to prepare a nonwoven sheet comprising a nonwoven sheet A having on one face thereof a binder layer comprising a binder and a scatterer of visible light dispersed in the binder.

A 35.6 cm (14 in) wide roll of nonwoven sheet A is unwound at a line speed of 152.4 cm/min (5 ft/min) and passed over a solid support backup roll. The binder containing scatterer used is Behr Premium Plus® Exterior Semi-Gloss Ultra Pure White No. 5050, available from BEHR Process Corporation, CA, USA, a white acrylic latex paint having 49% solids by weight, a density of 1.25 g/cm³, and viscosity of 13,000 cps. A coating of this paint is directly metered on to the moving nonwoven sheet surface at a rate of 77 cm³/min at a width of 33.0 cm (13 in) and wet thickness of 153.4 μm.

The height and width of the slot is set by a precise thickness of metal shim stock that separates the die halves when bolted together. The uniformity of the slot height determines the uniformity of flow across the width of the coating.

The volumetric flow to the slot die is controlled by a positive displacement gear pump which provides uniform, pulse-free delivery according to the pump shaft speed.

This volumetric flow is spread uniformly across the established width by the slot die then drawn away at a fixed rate by the established line speed to create a constant wet coating thickness.

The paint coated nonwoven sheet is then passed through a 9.1 m (30 ft) length dryer oven with zones set at temperatures of 60° C., 80° C. and 90° C. Impinging air in the oven removes the volatile components from the paint and results in the formation of the binder layer comprising binder and scatterer of visible light dispersed in the binder.

The thickness of the resultant binder layer is approximately 60 μm, neglecting partial penetration of the dried paint into the thickness of the nonwoven sheet.

Upon exiting the oven the painted nonwoven sheet is wound up into roll form that ultimately can be slit into required widths and chopped into individual products of desired dimensions.

A total reflectance spectrum is obtained for multiple (i.e., at least twelve) 34 mm×34 mm square painted nonwoven sheet samples by the aforementioned Spectrophotometer Method and the $R_{VIS}$ value calculated. Painted nonwoven sheet sample spectra are averaged to determine an average $R_{VIS}$ for nonwoven sheet B of 96.17%.

Nonwoven Sheet C

Described here is the nonwoven sheet (nonwoven sheet C) from which the EX. 1-C consolidated nonwoven sheet is produced by the present method.

A multilayer nonwoven sheet laminate is prepared comprising four layers of nonwoven sheet A with Nacor® 38-033A water-based pressure sensitive adhesive (available from National Starch of Bridgewater, N.J., USA) at each nonwoven sheet interface. The laminate is approximately 30.5 cm (twelve inches) square. The adhesive is applied using a #14 wire wound rod available from the Paul N. Gardner Company, Pompano Beach, Fla., USA. Adhesive is applied to one nonwoven sheet face and allowed to dry before the sheet is laminated. Six approximately 34 mm×34 mm square laminate samples are cut from a larger laminate. A total reflectance spectrum is obtained for each sample and $R_{VIS}$ calculated. The spectra are averaged to determine an average $R_{VIS}$ for the four-layer laminate. The average thickness of the nonwoven sheet laminate is 735.3 μm, the thickness standard deviation is 36.6 μm, and the average $R_{VIS}$ of nonwoven sheet C is 98.11.

Nonwoven Sheet D

Described here is the nonwoven sheet (nonwoven sheet D) from which the EX. 1-D consolidated nonwoven sheet is produced by the present method.

Manufacture of nonwoven sheet D is identical to Nonwoven Sheet A except for the following differences. Nonwoven sheet D is not thermal area bonded. Nonwoven sheet D average basis weight is 82 g/m².

Example 1

A B.F. Perkins, Sandston, Va., USA, two roll calender unit with 25.4 cm (10 in) diameter smooth steel surfaces, 61 cm (24 in) working length and adjustable fixed gap capability is used to process nonwoven sheets A, B C and D. Operating conditions involve setting the nip gap from 70% to 90% of the initial nonwoven sheet average thickness with calender loadings ranging from 500 to 1600 pounds per linear inch (pli) at room temperature. The calendering results are shown in Table 1.

TABLE 1

| Nonwoven Sheet | Calender Force Applied to Nonwoven Sheet (pli) | Average $R_{VIS}$ (%) | Average $R_{VIS}$ Standard Deviation (%) | Average Thickness (μm) | Thickness Standard Deviation (μm) |
|---|---|---|---|---|---|
| A | 0 (before calender) | 94.45 | 0.82 | 208 | 25 |
| A | 500 | 94.48 | 0.83 | 192 | 14 |
| A | 1000 | 94.86 | 0.61 | 175 | 10 |
| A | 1500 | 94.39 | 0.85 | 179 | 18 |
| B | 0 (before calender) | 96.17 | 0.82 | 248.4 | 24.9 |
| B | 500 | 96.20 | 0.87 | 223.8 | 22.1 |
| B | 1000 | 96.14 | 0.73 | 220.2 | 11.4 |
| B | 1500 | 96.25 | 0.75 | 226.8 | 10.9 |
| B | 1600 | 95.82 | 0.97 | 219.7 | 9.9 |
| C | 0 (before calender) | 98.11 | 0.44 | 735.3 | 36.5 |
| C | 500 | 97.79 | 0.41 | 712.3 | 18.8 |
| C | 1000 | 97.60 | 0.41 | 664.2 | 8.0 |
| C | 1500 | 97.57 | 0.41 | 607.7 | 13.3 |
| C | 1600 | 97.25 | 0.38 | 599.9 | 14.4 |
| D | 0 (before calender) | 97.78 | 0.52 | 357 | 44 |
| D | 500 | 97.64 | 0.49 | 346 | 32 |
| D | 1000 | 97.74 | 0.48 | 326 | 22 |
| D | 1500 | 97.49 | 0.54 | 307 | 15 |

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figure are to be regarded in an illustrative rather than a restrictive sense, and all such modifications are intended to be included within the scope of invention.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

It is to be appreciated that certain features are, for clarity, described herein in the context of separate embodiments, may also be provided in combination in a single embodiment. Conversely, various features that are, for brevity, described in the context of a single embodiment, may also be provided separately or in any subcombination. Further, reference to values stated in ranges include each and every value within that range.

What is claimed is:

1. A diffuse reflector comprising a consolidated nonwoven sheet having a thickness standard deviation of about 15 μm or less and a photopic reflectance of at least about 94% over the wavelength range of 380 nm to 780 nm.

2. The diffuse reflector of claim 1, wherein said thickness standard deviation is about 10 μm or less.

3. The diffuse reflector of claim 1, wherein said consolidated nonwoven sheet has an average thickness of from about 150 μm to about 400 μm.

4. The diffuse reflector of claim 1 produced by a method comprising calendering a nonwoven sheet having a first average thickness, a first thickness standard deviation and a first photopic reflectance, and thereby forming said consolidated nonwoven sheet having a consolidated average thickness less than said first average thickness, a consolidated thickness standard deviation less than said first thickness standard deviation, and a consolidated photopic reflectance substantially identical to said first photopic reflectance.

5. The diffuse reflector of claim 4 wherein said calendering is carried out at from about 500 pli (87 kN/m) to about 2,000 pli (350 kN/m).

6. The diffuse reflector of claim 1, wherein said consolidated nonwoven sheet comprises a plurality of plexifilamentary film-fibrils, wherein said plexifilamentary film-fibrils comprise polymer containing pores, and wherein the specific pore volume is at least about 10 $cm^3/m^2$ for pores having a mean pore diameter as measured by mercury porosimetry of from 0.01 μm to 1.0 μm.

7. A diffuse reflective article comprising a diffuse reflector of light positioned within a structure defining an optical cavity, wherein said diffuse reflector of light comprises a consolidated nonwoven sheet having a thickness standard deviation of about 15 μm or less and a photopic reflectance of at least about 94% over the wavelength range of 380 nm to 780 nm.

8. An optical display, comprising:
   (i) a structure defining an optical cavity;
   (ii) a light source positioned within said optical cavity;
   (iii) a display panel through which light from said light source passes; and
   (iv) a diffuse reflector positioned within said optical cavity for reflecting light from said light source toward said display panel, wherein said diffuse reflector of light comprises a consolidated nonwoven sheet having a thickness standard deviation of about 15 μm or less and a photopic reflectance of at least about 94% over the wavelength range of 380 nm to 780 nm.

9. A method for producing a diffuse reflector comprising a consolidated nonwoven sheet, comprising applying mechanical force to a nonwoven sheet having a first average thickness, a first thickness standard deviation and a first photopic reflectance, and thereby forming a consolidated nonwoven sheet having a consolidated average thickness less than said first average thickness, a consolidated thickness standard deviation less than said first thickness standard deviation, and a consolidated photopic reflectance substantially identical to said first photopic reflectance.

10. The method of claim 9, wherein said consolidated average thickness is from about 75% to about 95% of said first average thickness, and said consolidated thickness standard deviation is from about 25% to about 55% of said first thickness standard deviation.

11. The method of claim 9, wherein said consolidated average thickness is from about 150 μm to about 400 μm.

12. The method of claim 9, wherein said consolidated thickness standard deviation is about 15 μm or less.

13. The method of claim 9, wherein said consolidated thickness standard deviation is about 10 μm or less.

14. The method of claim 9, wherein said diffuse reflector has a photopic reflectance of at least about 94% over the wavelength range of 380 nm to 780 nm.

15. The method of claim 9, wherein said nonwoven sheet comprises a plurality of plexifilamentary film-fibrils, wherein said plexifilamentary film-fibrils comprise polymer containing pores, and wherein the specific pore volume is at least about 10 $cm^3/m^2$ for pores having a mean pore diameter as measured by mercury porosimetry of from 0.01 μm to 1.0 μm.

16. The method of claim 9, wherein said applying mechanical force comprises calendering.

17. The method of claim 16, wherein said calendering is carried out at from about 500 pli (87 kN/m) to about 2,000 pli (350 kN/m).

18. The method of claim 9, wherein said consolidated nonwoven sheet further comprises on at least one face thereof a binder layer comprising a binder and a scatterer of visible light dispersed in said binder.

19. The method of claim 9, wherein said nonwoven sheet comprises a laminate of a plurality of layers of nonwoven sheet.

20. A method of improving light reflectivity in a device requiring diffuse reflectivity of light comprising:
  (i) providing a diffuse reflector comprising a consolidated nonwoven sheet having a thickness standard deviation of about 15 μm or less and a photopic reflectance of at least about 94% over the wavelength range of 380 nm to 780 nm; and
  (ii) positioning said diffuse reflector within said device to cause light energy to reflect off of said diffuse reflector.

* * * * *